United States Patent
Marsetti et al.

(10) Patent No.: US 12,515,883 B2
(45) Date of Patent: Jan. 6, 2026

(54) SEALING HOUSING ELEMENT FOR THE MAGNETS OF A SUPPORT AND GUIDE MAGNETIC STRUCTURE FOR CONVEYORS WITH ARTICULATED LINKS

(71) Applicant: MOVEX S.P.A., Castelli Calepio (IT)

(72) Inventors: Sergio Marsetti, Paradiso (CH); Matteo Marsetti, Telgate (IT)

(73) Assignee: MOVEX S.P.A., Castelli Calepio (IT)

( * ) Notice: Subject to any disclaimer, the term of this patent is extended or adjusted under 35 U.S.C. 154(b) by 90 days.

(21) Appl. No.: 18/680,935

(22) Filed: May 31, 2024

(65) Prior Publication Data

US 2024/0400311 A1    Dec. 5, 2024

(30) Foreign Application Priority Data

Jun. 1, 2023    (IT) ......................... 102023000011184

(51) Int. Cl.
*B65G 21/20*    (2006.01)

(52) U.S. Cl.
CPC ...... *B65G 21/2009* (2013.01); *B65G 2207/26* (2013.01)

(58) Field of Classification Search
CPC ............ B65G 21/2009; B65G 21/2018; B65G 2207/26
USPC ................................................. 198/837, 841
See application file for complete search history.

(56) References Cited

U.S. PATENT DOCUMENTS

| | | | | |
|---|---|---|---|---|
| 5,199,551 A | * | 4/1993 | Wallaart | B65G 21/2009 198/852 |
| 6,085,896 A | * | 7/2000 | van Zijderveld | B65G 21/22 198/805 |
| 6,101,696 A | * | 8/2000 | Carter | B24B 23/02 29/90.01 |

(Continued)

FOREIGN PATENT DOCUMENTS

| | | |
|---|---|---|
| DE | 60307845 T2 | 3/2007 |
| DE | 202022103780 U1 | 7/2022 |

(Continued)

*Primary Examiner* — Mark A Deuble
(74) *Attorney, Agent, or Firm* — Dickinson Wright PLLC; Andrew D. Dorisio (57) ABSTRACT

A housing element (1) for the magnets (12, 14) of a support and guide magnetic structure (100) for conveyors (102) with articulated links is described. The housing element comprises a box-shaped body (10) comprising two seats (24, 26) for the magnets, openings (28, 30) for inserting the magnets in the seats, a housing portion (32) for a ferromagnetic plate (34), which is designed to come into contact with the magnets, and at least one retaining portion (36) to retain the magnets to the box-shaped body. The retaining portion is shaped and sized in such a way that it can retain the magnets by friction, while the plate is held in the respective housing portion by the magnetic force of the magnets. On the external surface of the box-shaped body at least one notch (38), which is designed to house and retain at least one corresponding sealing element (40), is obtained. This sealing element is arranged to prevent the access of unwanted substances inside the seats of the magnets and the housing portion when the housing element is mounted onto the support and guide magnetic structure.

7 Claims, 6 Drawing Sheets

(56) References Cited

U.S. PATENT DOCUMENTS

| | | | | |
|---|---|---|---|---|
| 6,102,191 | A * | 8/2000 | Janzen | B65G 21/2018 |
| | | | | 198/689.1 |
| 6,155,406 | A * | 12/2000 | Garbagnati | B65G 21/2009 |
| | | | | 198/805 |
| 7,597,188 | B2 * | 10/2009 | Volpi | B65G 21/2009 |
| | | | | 198/690.1 |
| 7,762,386 | B2 * | 7/2010 | Allore | B65G 17/46 |
| | | | | 198/690.1 |
| 11,034,520 | B2 * | 6/2021 | Garbagnati | B65G 21/16 |
| 11,365,059 | B2 * | 6/2022 | Marsetti | B65G 21/16 |
| 2006/0081448 | A1 * | 4/2006 | Fandella | B65G 17/086 |
| | | | | 198/805 |

FOREIGN PATENT DOCUMENTS

| | | |
|---|---|---|
| EP | 4122845 A1 | 1/2023 |
| WO | 2018172290 A1 | 9/2018 |

\* cited by examiner

SEALING HOUSING ELEMENT FOR THE MAGNETS OF A SUPPORT AND GUIDE MAGNETIC STRUCTURE FOR CONVEYORS WITH ARTICULATED LINKS

This document claims priority to Italian Patent Application No. 102023000011184 filed on Jun. 1, 2023, the disclosure of which is hereby incorporated by reference.

TECHNICAL FIELD

The present invention generally relates to the technical field of the support and guide magnetic structures for the conveyors with articulated links and, in particular, a sealing housing element for the magnets of a support and guide magnetic structure for one or more conveyors with articulated links.

BACKGROUND

A support and guide magnetic structure for one or more conveyors with articulated links is usually provided with a plurality of magnets, the technical function of which is to prevent the conveyors moving along such support and guide magnetic structure from uplifting and/or detaching from the support and guide magnetic structure. These magnets are usually housed, together with a plate-shaped ferromagnetic component adapted to generate a magnetic field, in respective housing elements which must be made integral with the support and guide magnetic structure through appropriate fixing means.

Housing elements of the type indicated above are already known and are disclosed, for example, in the prior art document EP 0916599 A1. Assembling these known housing elements on the support and guide magnetic structure is however difficult, as the magnets tend to attach to the ferromagnetic plate, which is provided in each housing element, in positions which are undesired and do not coincide with the seats provided in the housing element for housing the magnets. Assembling these known housing elements is further complicated by the fact that the ferromagnetic plate must be constrained to the housing element by means of screws, that is to say by means of fastening means which are specially intended to this purpose and to be added to the housing element.

The applicant has therefore developed a new type of improved housing element for the magnets of a support and guide magnetic structure. This improved housing element is disclosed in the prior art document EP 4122845 A1, on which the preamble of claim 1 is based. This improved housing element does not require specific fastening means to be constrained to the support and guide magnetic structure. The housing element disclosed in the prior art document EP 4122845 A1 can be provided with a sealing element, which is generally manufactured in the form of an O-ring, positioned close to the covering wall of the housing element.

During the transport of various kinds of objects, typically but not exclusively consisting of food products, the conveyors with articulated links can be spoiled due to the dropping of different kinds of substances, often in a liquid state, from the transported objects. These substances can enter the housing elements for housing the magnets, compromising their functionality.

In the event that, as in the prior art document EP 4122845 A1, the sealing element is positioned close to the covering wall of the housing element, that is to say close to the surface of the support and guide magnetic structure, which is the surface onto which various substances can fall (typically liquid substances), however, a reliable seal is not guaranteed. Conversely, if the sealing element were positioned deeper in the cavity of the support and guide magnetic structure, which is the cavity into which the containment element is inserted, then a more reliable sealing would be obtained than the one disclosed in the prior art document EP 4122845 A1 (in particular in FIG. 13B thereof), due to a better coupling between the sealing element and the corresponding cavity. In other words, by positioning the sealing element deeper in the cavity of the support and guide magnetic structure, this sealing element more safely prevents the access of liquids and/or other unwanted substances into the housings for the magnets.

SUMMARY

The object of the present invention is, therefore, to provide a sealing housing element for a support and guide magnetic structure for conveyors with articulated links which is capable of solving the above-mentioned drawback of the prior art in an extremely simple, economical and particularly functional way.

In detail, it is an object of the present invention to provide a sealing housing element for magnets which is capable of preventing the access of unwanted and/or dirty substances inside the housing element, in particular inside the housings for the magnets.

This and other objects according to the present invention will be achieved by providing a sealing housing element for the magnets of a support and guide magnetic structure for conveyors with articulated links as set forth in claim 1.

Further features of the invention are highlighted by the dependent claims, which are an integral part of the present description.

BRIEF DESCRIPTION OF THE DRAWINGS

The features and advantages of a sealing housing element for the magnets of a support and guide magnetic structure for conveyors with articulated links according to the present invention will be clearer from the following exemplifying and hence non-limiting description, referring to the attached schematic drawings in which.

DETAILED DESCRIPTION

With reference in particular to FIGS. 1 to 6, a preferred embodiment of a magnet housing element according to the present invention is shown. The housing element is indicated as a whole with reference number 1 and is designed to house at least two magnets 12, 14.

Figure 7:
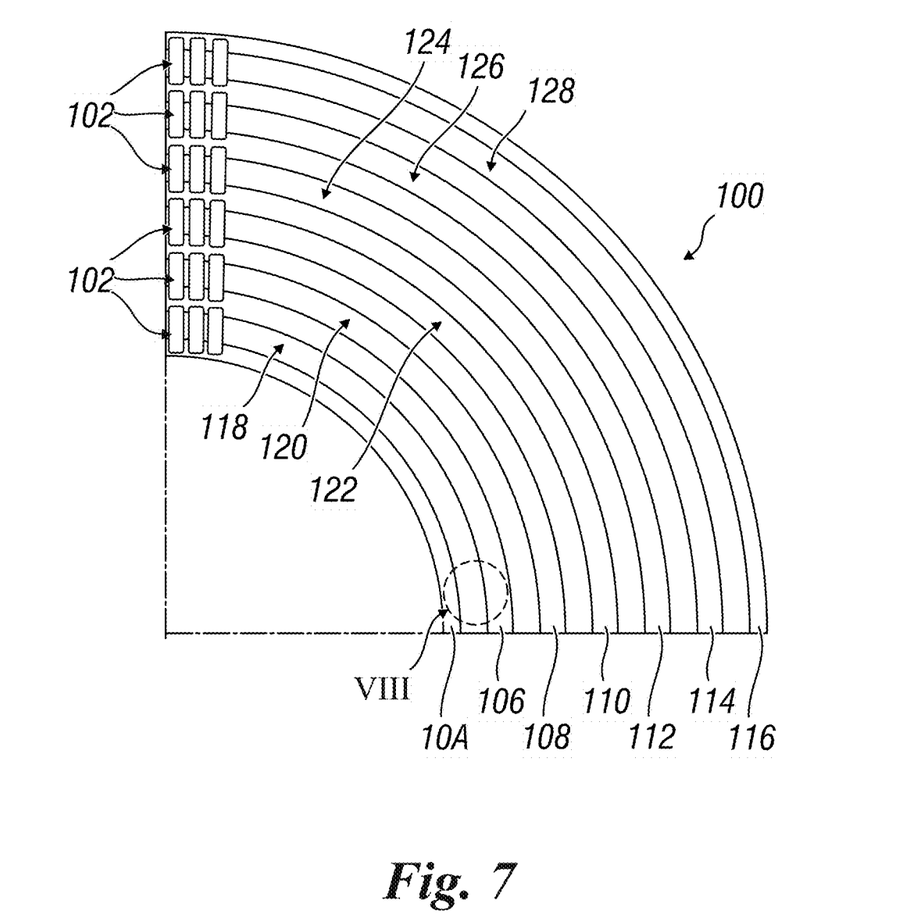
FIG. 7 is a schematic top view of a support and guide magnetic structure, in particular with a curved shape and with six guide tracks, on which the magnet housing elements such as the one of FIGS. 1 to 6 can be connected.
Figure 8:
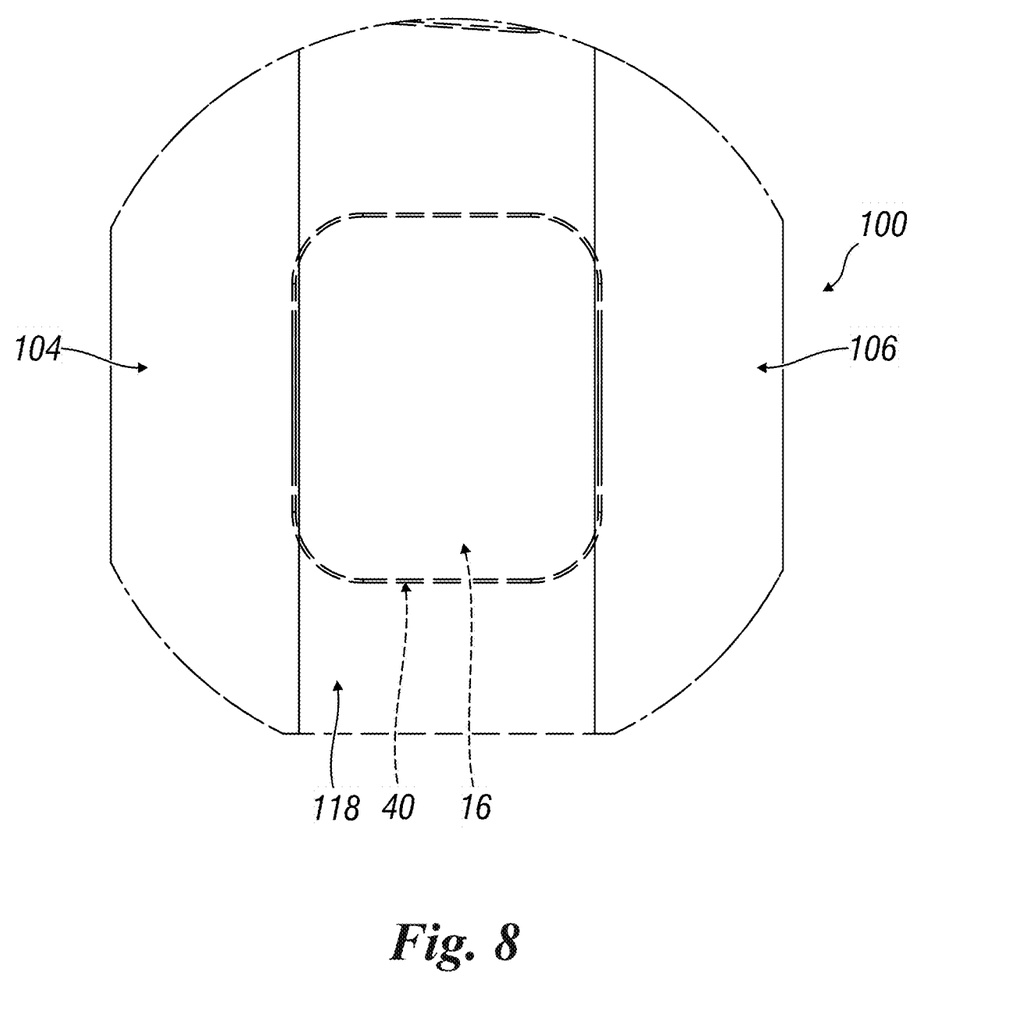
FIG. 8 is a detail view of the detail indicated with VIII in FIG. 7.

The housing element 1 is of the type adapted to be mounted onto a support and guide magnetic structure 100 (see FIGS. 7 and 8). The support and guide magnetic structure 100 is of a conventional type and generally has a curvilinear development axis. This support and guide magnetic structure 100 is of the type which comprises, for example, a pair of guides 104, 106; 106, 108; 108, 110; 110, 112; 112, 114; 114, 116 (FIG. 7), distinct and arranged at a predefined and constant distance from each other. Each guide 104, 106; 106, 108; 108, 110; 110, 112; 112, 114; 114, 116 is oriented according to a respective curvilinear development axis and defines a respective sliding track 118, 120, 122, 124, 126, 128 for a respective conveyor 102 with articulated links. These conveyors 102 with articulated links are schematically and partially represented in FIG. 7.

Each housing element 1 comprises a box-shaped body 10 comprising in turn at least one bottom wall 16, at least one side wall 18, at least one end wall 20 and at least one internal central wall 22. All these bottom 16, side 18, end 20 and internal central 22 walls delimit at least two seats 24, 26 in the box-shaped body 10 of the housing element 1 for housing the magnets 12, 14. In the exemplary embodiment shown in FIGS. 1 to 6, the box-shaped body 10 of the housing element 1 has a substantially parallelepiped shape and is open at the top at the two seats 24, 26 for housing the magnets 12, 14. The box-shaped body 10 of the housing element 1 in fact comprises at least two openings 28, 30 for inserting the magnets 12, 14 in the respective seats 24, 26. These openings 28, 30 are in the opposite position with respect to the bottom wall 16 of the box-shaped body 10 and are laterally delimited by the side wall 18, the end wall 20 and the internal central wall 22 of the box-shaped body 10.

In addition to the two magnets 12, 14, the housing element 1 further comprises a plate 34, which is manufactured with a ferromagnetic material and is designed to come into contact with the magnets 12, 14. The box-shaped body 10 of the housing element 1 then comprises at least one housing portion 32 which is shaped and sized in such a way that it can house the plate 34. In the exemplary embodiment shown in FIGS. 1 to 6, the side walls 18, and/or the end walls 20 also delimit the housing portion 32 of the plate 34. The housing portion 32 of the plate 34 is thus formed by the upper portions of the side walls 18 and the end walls 20 of the box-shaped body 10.

The plate 34 can be held in the respective housing portion 32 at least by the magnetic force of the magnets 12, 14. In a preferred embodiment the plate 34, when housed in its own housing portion 32, closes the box-shaped body 10 of the housing element 1, in an opposite position with respect to the bottom wall 16, and at the same time it is held in such housing portion 32 only by the magnetic force of the magnets 12, 14. The magnets 12, 14 thus have a portion 12A, 14A thereof in contact with the plate 34. In an alternative embodiment the plate 34 could be held in the respective housing portion 32 by both the magnetic force of the magnets 12, 14, and also by friction between the external side surfaces of such plate 34 and the internal surfaces of the housing portion 32, which coincide with the upper portions of the side walls 18 and the end walls 20 of the box-shaped body 10.

The box-shaped body 10 of the housing element 1 further comprises at least one retaining portion 36 for each magnet 12, 14. The retaining portions 36 are designed to retain the magnets 12, 14 constrained to the box-shaped body 10 in a predetermined position, in order to facilitate the positioning and/or the handling of the magnets 12, 14 and the assembly of the housing element 1. Each retaining portion 36 is shaped and sized in such a way that it can retain the magnets 12, 14 constrained in the respective seats 24, 26 by mutual friction between the side surfaces of the magnets 12, 14 and the surfaces of the seats 24, 26, which come into contact with each other. In the exemplary embodiment shown in FIGS. 1 to 6, each retaining portions 36 comprises at least one rib 42, which faces each seat 24, 26 for housing the magnets 12, 14 and is raised with respect to the internal surfaces 18A, 20A, 22A of the side walls 18 and/or the end walls 20 and/or the internal central wall 22, respectively, of the box-shaped body 10.

According to the above-mentioned configuration, each housing element 1 is adapted to hold one or more conveyors 102 with articulated links, which are movable along such support and guide magnetic structure 100, integral with the support and guide magnetic structure 100. Each conveyor 102 in fact is at least partially manufactured in a metal material or, in any case, in a magnetisable material. The magnets 12, 14 and the ferromagnetic plate 34 generate a magnetic field whose function is to make the conveyors 102 rest on the support and guide magnetic structure 100 in a coplanar manner, without inclinations and/or uplifting.

On the external surface of the side walls 18 and/or the end walls 20 of the box-shaped body 10, which is the surface facing the opposite side with respect to the seats 24, 26 for housing the magnets 12, 14, at least one notch 38, which is designed to house and retain at least one corresponding sealing element 40, is obtained. This sealing element 40 is arranged to prevent the access of unwanted substances inside the seats 24, 26 for housing the magnets 12, 14 and inside the housing portion 32 of the plate 34 when the housing element 1 is mounted onto the support and guide magnetic structure 100.

Preferably the notch 38 is a continuous notch which extends along all the respective side walls 18 and end walls 20 of the box-shaped body 10. Again, preferably, the sealing element 40 consists of a gasket which is made of an elastomeric material. In detail, this gasket could preferably consist of an O-ring.

Each housing element 1 is provided with connecting means 44 for connection with respective connecting means (not shown) which are provided in the support and guide magnetic structure 100. These connecting means 44 are obtained on the external surface of the side walls 18 and/or the end walls 20 of the box-shaped body 10. The connecting means 44 of the housing element 1 and the respective connecting means of the support and guide magnetic structure 100 are conveniently of the male/female type and are adapted to snap-connecting each housing element 1 with the support and guide magnetic structure 100.

The connecting means 44 of the housing element 1 are formed by a projection with a rounded cross-section, which protrudes from the external surface of the side walls 18 and/or the end walls 20. More in detail, as shown in FIGS. 1 to 6, the projection 44 is a continuous projection which extends along all the respective side walls 18 and the respective end walls 20 of the box-shaped body 10 of the housing element 1.

Figure 1:
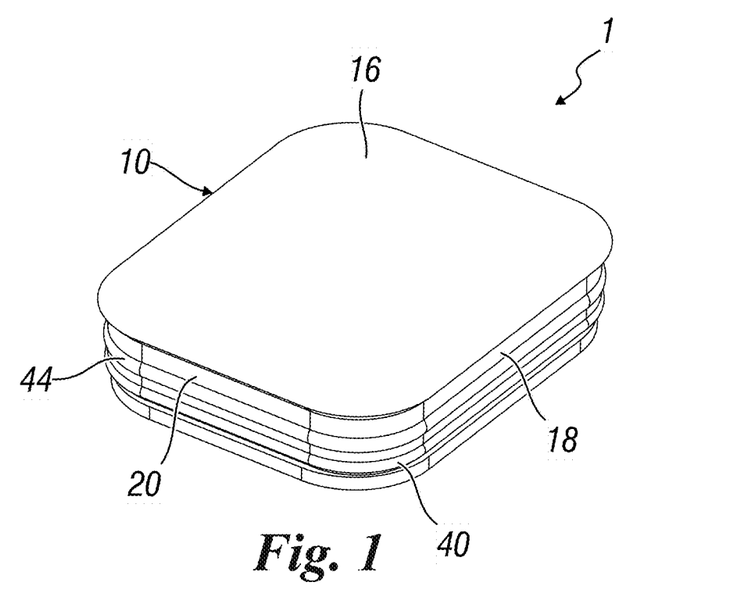
FIG. 1 is a perspective top view of a magnet housing element according to the present invention, shown in a fully assembled configuration.
Figure 2:
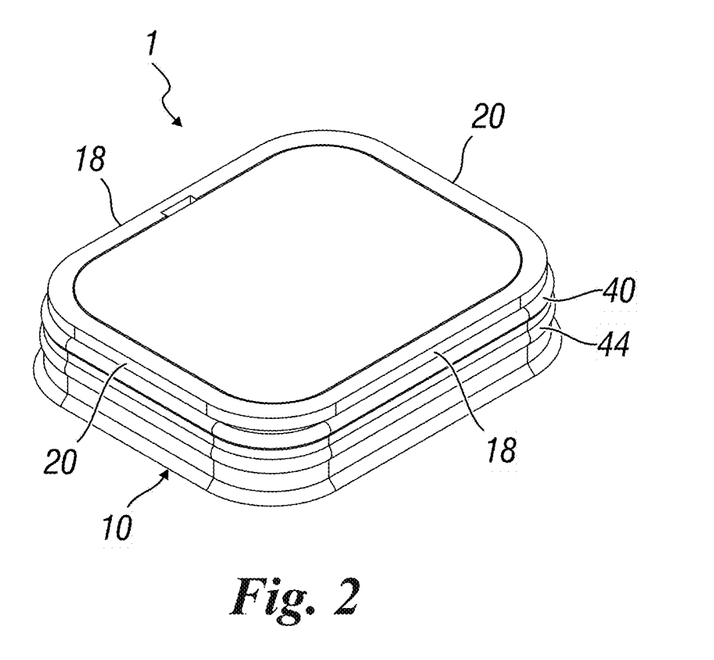
FIG. 2 is a bottom perspective view of the magnet housing element of FIG. 1.
Figure 3:
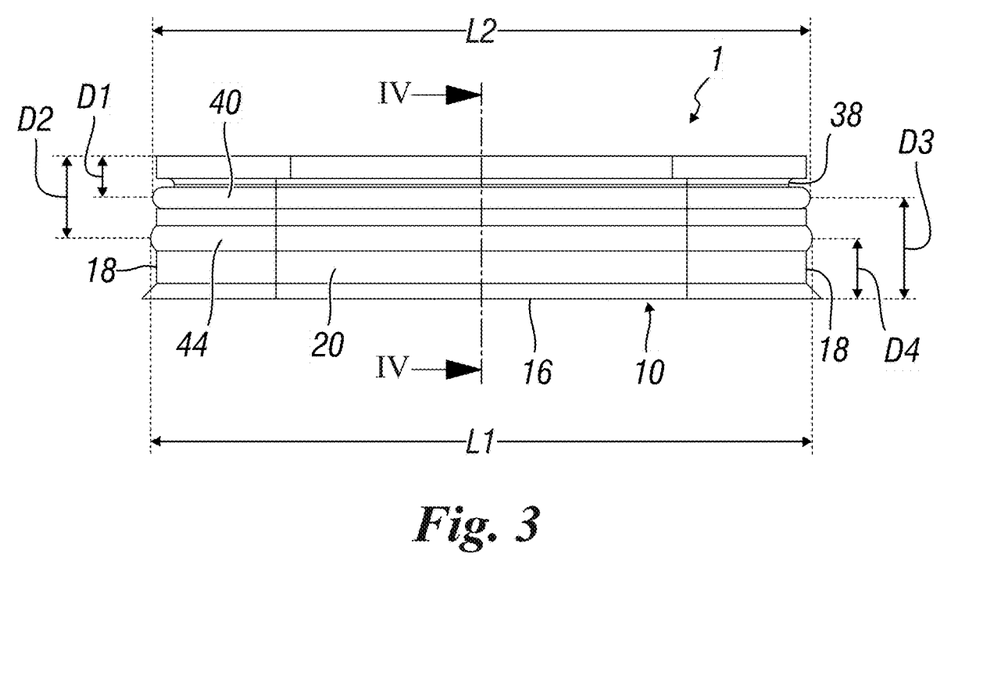
FIG. 3 is a side view of the magnet housing element of FIG. 1.
Figure 4:
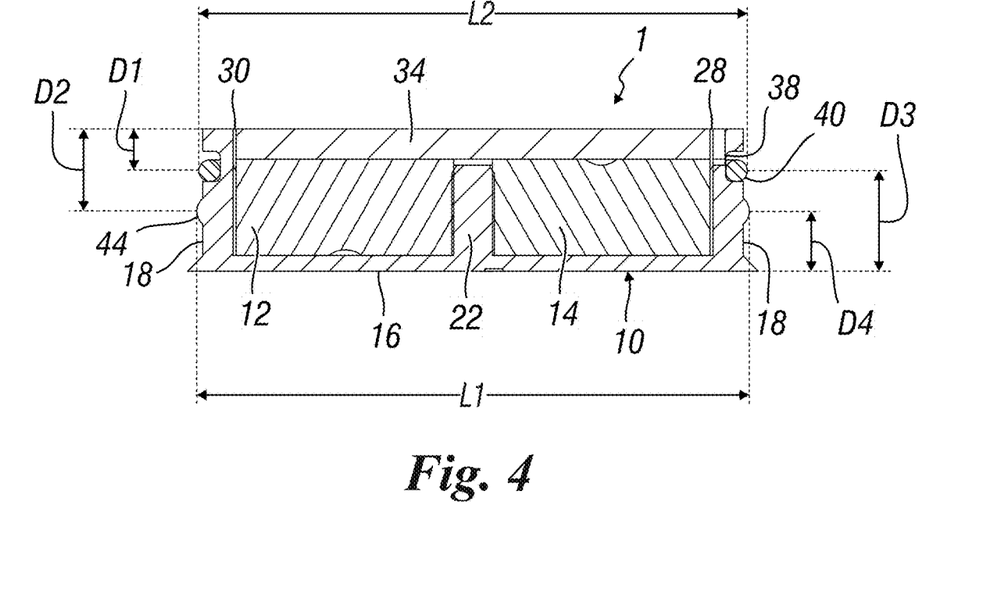
FIG. 4 is a sectional view, obtained along line IV-IV of FIG. 3, of the magnet housing element of FIG. 1.
Figure 5:
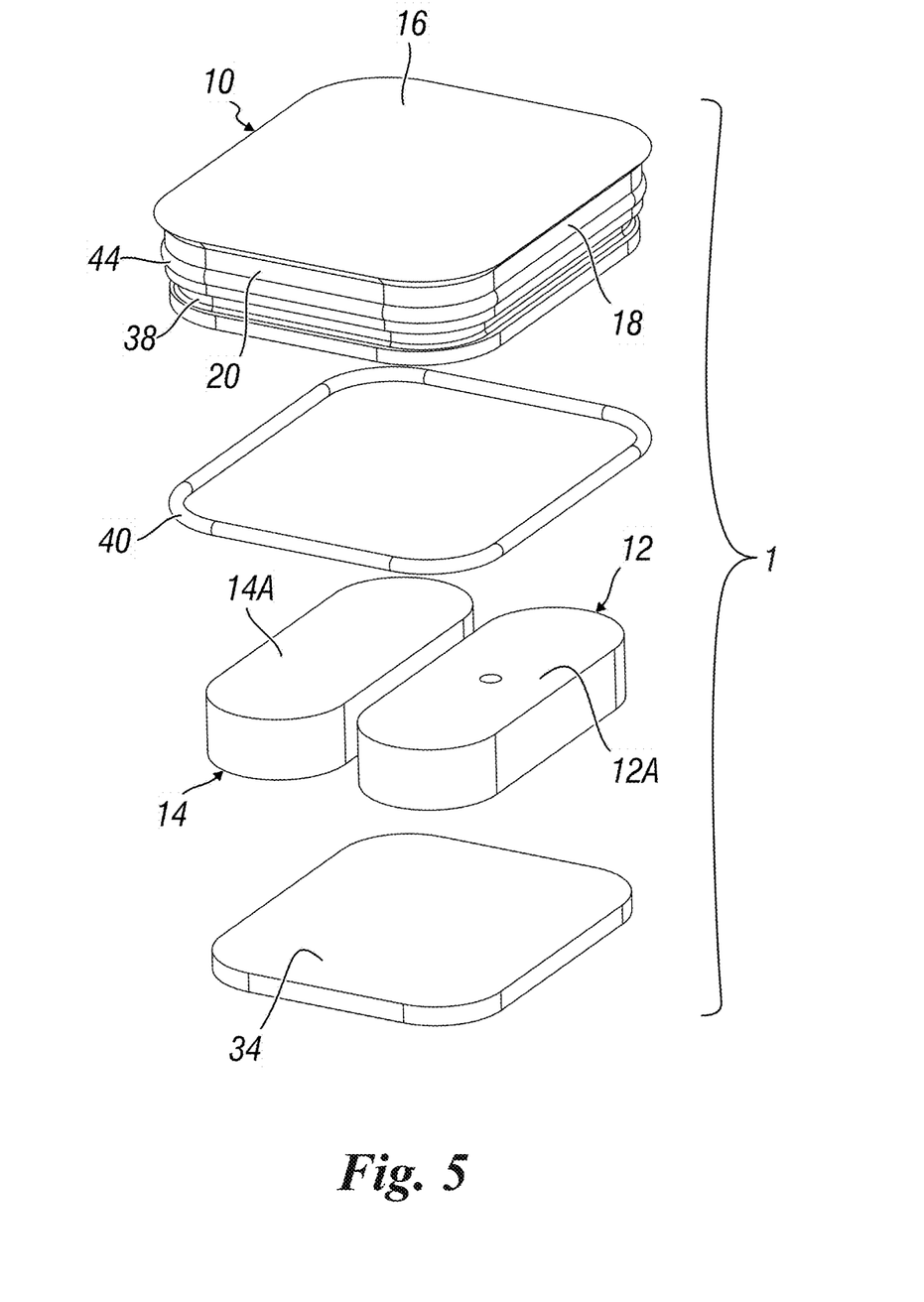
FIG. 5 is an exploded perspective top view of the components of the magnet housing element of FIG. 1.
Figure 6:
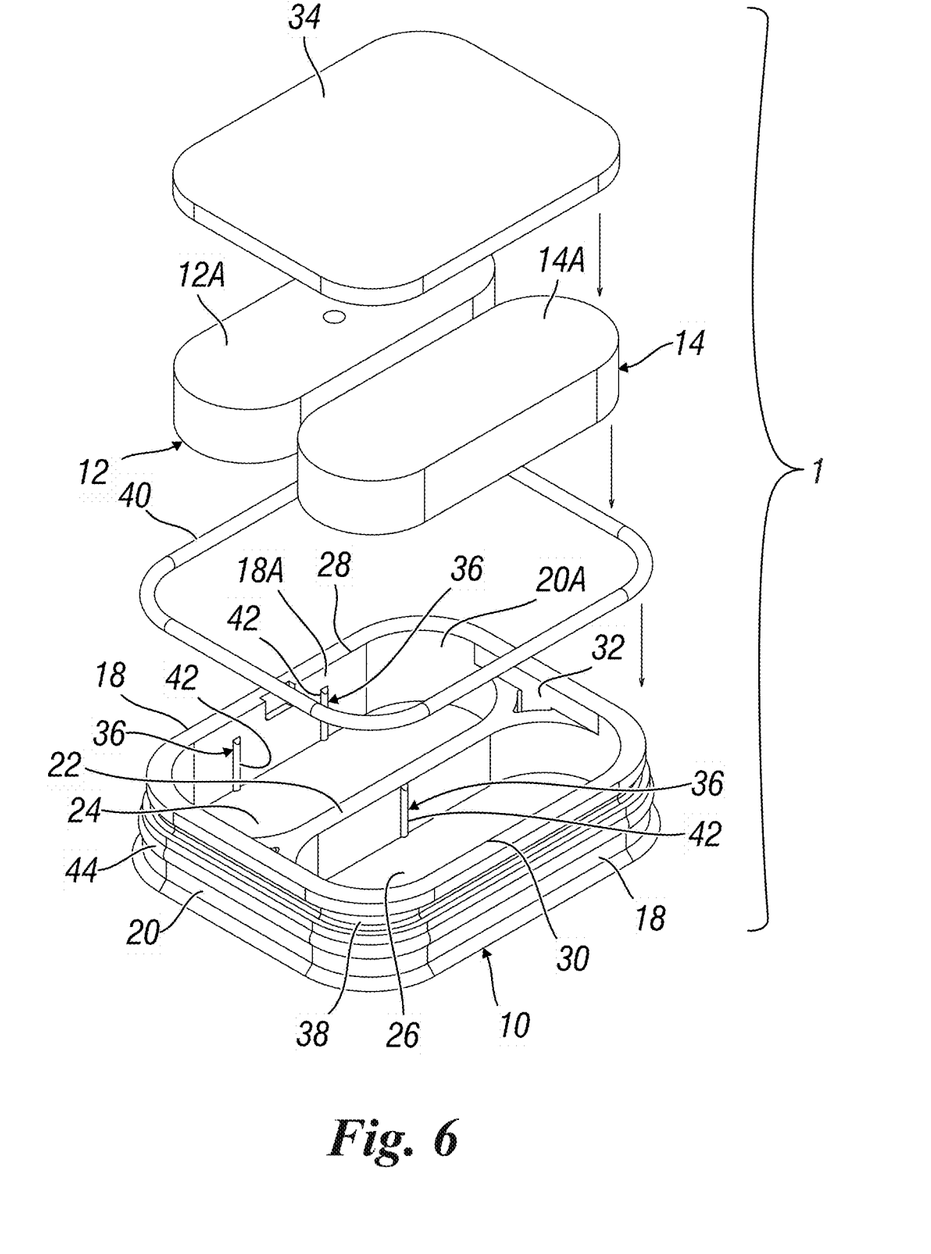
FIG. 6 is an exploded perspective bottom view of the components of the magnet housing element of FIG. 1.

According to the invention, in order to ensure an effective seal, the notch 38 and the corresponding sealing element 40 are positioned along the side walls 18 and the end walls 20 of the box-shaped body 10 near the openings 28, 30, so as to more easily prevent the access of unwanted substances into these openings 28, 30. Conversely, the projection 44 is positioned along the side walls 18 and the end walls 20 of the box-shaped body 10 near the bottom wall 16. In other words, as shown in FIGS. 3 and 4, the notch 38 and the corresponding sealing element 40 are at an average distance D1 from the openings 28, 30 which is less than the average distance D2 of the projection 44 from such openings 28, 30. Hence the notch 38 and the corresponding sealing element 40 are at an average distance D3 from the bottom wall 16 which is greater than the average distance D4 of the projection 44 from said bottom wall 16. In other words, the notch 38 and the corresponding sealing element 40 are closer to the openings 28, 30 with respect to the projection 44, while the projection 44 is closer to the bottom wall 16 with respect to the notch 38 and the corresponding sealing element 40.

Furthermore, the maximum distance L1 between the opposite terminal ends of the projection 44 is greater than the maximum distance L2 between the corresponding opposite terminal ends of the sealing element 40 (see, in particular, FIGS. 3 and 4). By "corresponding opposite terminal ends" it is meant the terminal ends of the projection 44 and the sealing element 40 which are located on the same side wall 18 of the box-shaped body 10 of the housing element 1. In other words, the thickness or maximum width L1 of the box-shaped body 10 of the housing element 1, when measured at opposite terminal ends of the projection 44, is greater than the maximum thickness or width L2 of the box-shaped body 10, when measured at the opposite terminal ends of the sealing element 40 which are located on the same side wall 18 on which also the aforementioned opposite terminal ends of the projection 44 are located. These dimensional relationships obviously occur when the housing element 1 is in non-operational conditions, that is to say when the housing element 1 is not inserted into the respective cavity of the support and guide magnetic structure 100. Conversely, when the housing element 1 is inserted into the respective cavity of the support and guide magnetic structure 100, the projection 44, while undergoing a deformation due to compression during assembly, guarantees total adherence to the walls of the cavity of the support and guide magnetic structure 100 and forms an initial barrier against the introduction of unwanted and/or dirty substances inside the housing element 1. These unwanted and/or dirty substances, if they leaked beyond the projection 44, would in any case be definitively retained by the sealing element 40, which is positioned beyond the projection 44 starting from the bottom wall 16 of the housing element 1.

It has thus been seen that the sealing housing element for the magnets of a support and guide magnetic structure for conveyors with articulated links according to the present invention achieves the previously highlighted purposes.

The sealing housing element for the magnets of a support and guide magnetic structure for conveyors with articulated links according to the present invention thus conceived is however susceptible of numerous modifications and variations, all of which falling within the scope of the same inventive concept; furthermore, all the details can be replaced by technically equivalent elements. In practice, the materials used, as well as the shapes and dimensions, may be any according to the technical requirements.

The scope of protection of the invention is therefore defined by the attached claims.

The invention claimed is:

1. A housing element (1) of the type adapted to be mounted onto a support and guide magnetic structure (100), said housing element (1) being adapted to hold a conveyor (102) with articulated links, which is movable along said support and guide magnetic structure (100), integral with said support and guide magnetic structure (100), wherein said housing element (1) comprises:
at least two magnets (12, 14);
at least one plate (34), which is manufactured with a ferromagnetic material and is designed to come into contact with said magnets (12, 14); and
a box-shaped body (10),
wherein said box-shaped body (10) comprises:
at least one bottom wall (16), at least one side wall (18), at least one end wall (20) and at least one internal central wall (22), wherein said walls (16; 18; 20; 22) delimit at least two seats (24, 26) in the box-shaped body (10) for housing said magnets (12, 14);
at least two openings (28, 30) for inserting said magnets (12, 14) in said seats (24, 26), wherein said openings (28, 30) are in the opposite position with respect to said bottom wall (16);
at least one housing portion (32) which is shaped and sized in such a way that it can house said plate (34);
at least one retaining portion (36), which is designed to retain said magnets (12, 14) constrained to said box-shaped body (10) in a predetermined position, in order to facilitate the positioning and/or handling of the magnets (12, 14) and the assembly of the housing element (1); and
at least one sealing element (40), which is arranged to prevent the access of unwanted substances inside said seats (24, 26) and said at least one housing portion (32) when the housing element (1) is mounted onto the support and guide magnetic structure (100),
wherein said retaining portion (36) is shaped and sized in such a way that it can retain said magnets (12, 14) constrained in the respective seats (24, 26) by mutual friction between the surfaces of said magnets (12, 14) and the surfaces of said seats (24, 26), which come into contact with each other, wherein said plate (34) is held in the respective housing portion (32) at least by the magnetic force of said magnets (12, 14), wherein on the external surface of said at least one side wall (18) and/or said at least one end wall (20), which is the surface facing the opposite side with respect to said seats (24, 26), there are obtained:
at least one notch (38), which is designed to house and retain at least one corresponding sealing element (40);
connecting means (44) for connecting the housing element (1) with respective connecting means which are provided in said support and guide magnetic structure (100), wherein the connecting means (44) of the housing element (1) and the respective connecting means of the support and guide magnetic structure (100) are of the male/female type and are adapted to snap-connecting the housing element (1) with the support and guide magnetic structure (100),
wherein said connecting means (44) are formed by a projection with a rounded cross-section, which protrudes from the external surface of said at least one side wall (18) and/or said at least one end wall (20), the housing element (1) being wherein said notch (38) with the corresponding sealing element (40) are at an average distance (D1) from said openings (28, 30) which is less than the average distance (D2) of said projection from said openings (28, 30), hence said notch (38) with the corresponding sealing element (40) are at an average distance (D3) from said bottom wall (16) which is greater than the average distance (D4) of said projection from said bottom wall (16), and in that the maximum distance (L1) between the opposite terminal ends of said projection is greater than the maximum distance (L2) between the corresponding opposite terminal ends of said sealing element (40).

2. The housing element (1) according to claim 1, wherein said notch (38) is a continuous notch which extends along all the respective side walls (18) and the end walls (20) of said box-shaped body (10).

3. The housing element (1) according to claim 2, wherein said sealing element (40) consists of a gasket which is made of an elastomeric material.

4. The housing element (1) according to claim 3, wherein said gasket is an O-ring.

5. The housing element (1) according to claim 1, wherein said retaining portion (36) comprises at least one rib (42), which faces each seat (24, 26) and is raised with respect to the internal surface (18A; 20A; 22A) of said at least one side wall (18) or said at least one end wall (20) or said at least one internal central wall (22), respectively.

6. The housing element (1) according to claim 5, wherein said at least one side wall (18) or said at least one end wall (20) also delimit said housing portion (32), wherein said plate (34), when housed in said housing portion (32), closes said box-shaped body (10) and at the same time it is held in said housing portion (32) by the magnetic force of said magnets (12, 14), and wherein said magnets (12, 14) have a portion (12A, 14A) thereof in contact with said plate (34).

7. The housing element (1) according to claim 1, wherein said projection is a continuous projection, which extends along all the respective side walls (18) and the respective end walls (20) of said box-shaped body (10).

\* \* \* \* \*